INVENTORS
SAMUEL J. RUPERT
WILLIAM E. ZIEGLER
BY
Olsen and Stephenson
ATTORNEYS

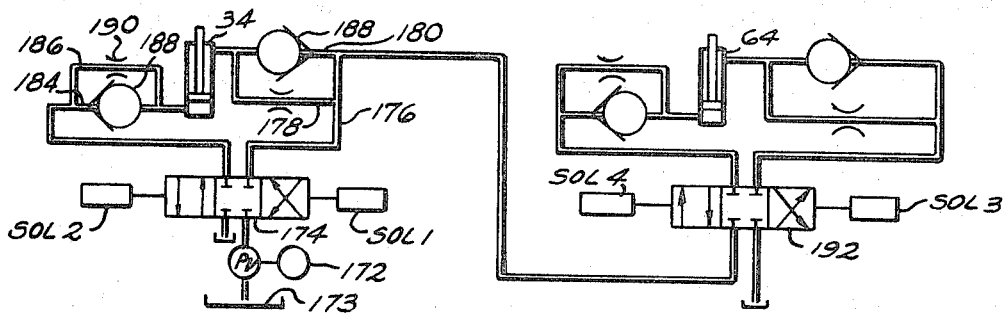
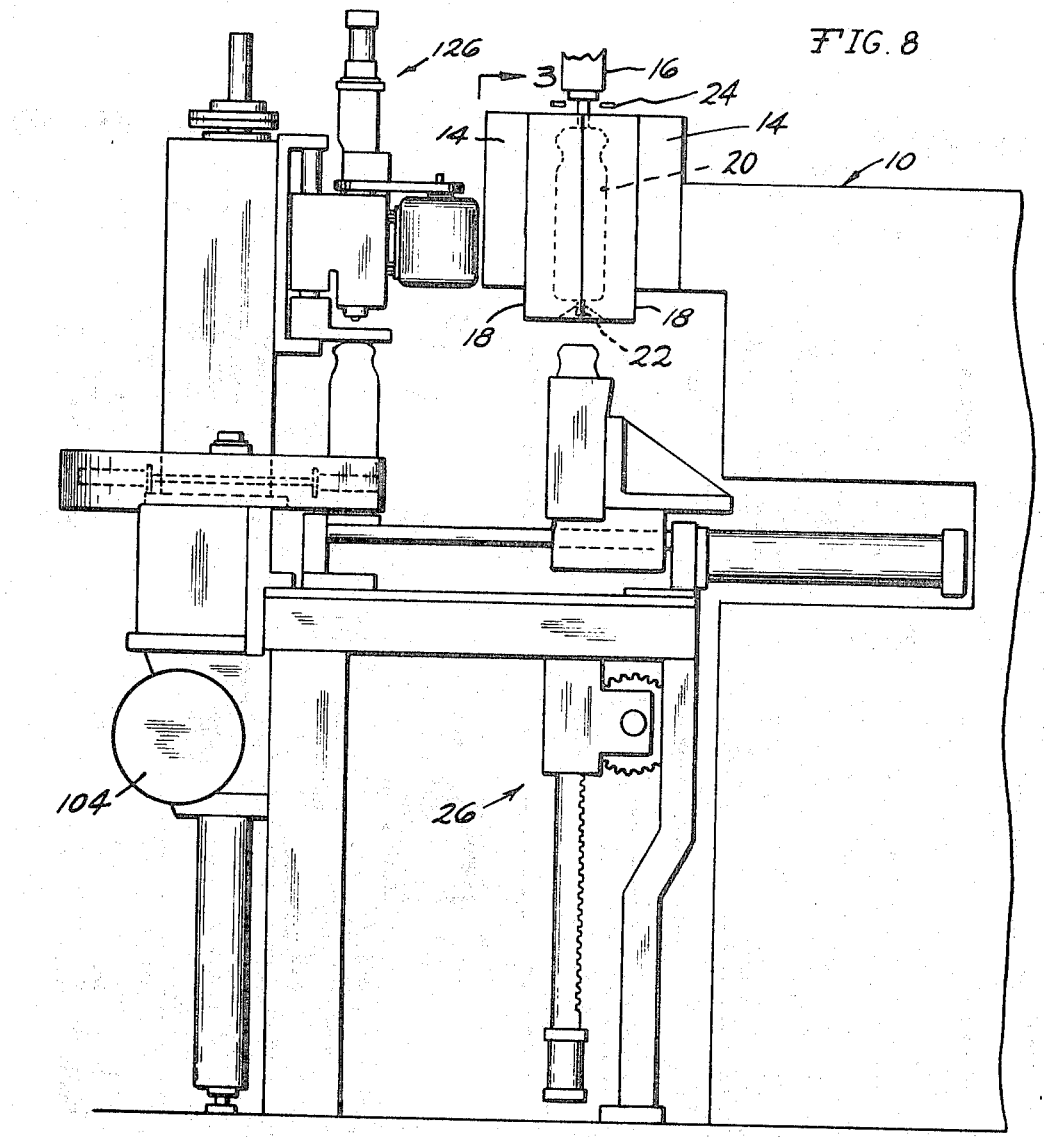
FIG. 2
FIG. 8
INVENTORS
SAMUEL J. RUPERT
WILLIAM E. ZIEGLER
BY
Olsen and Stephenson
ATTORNEYS

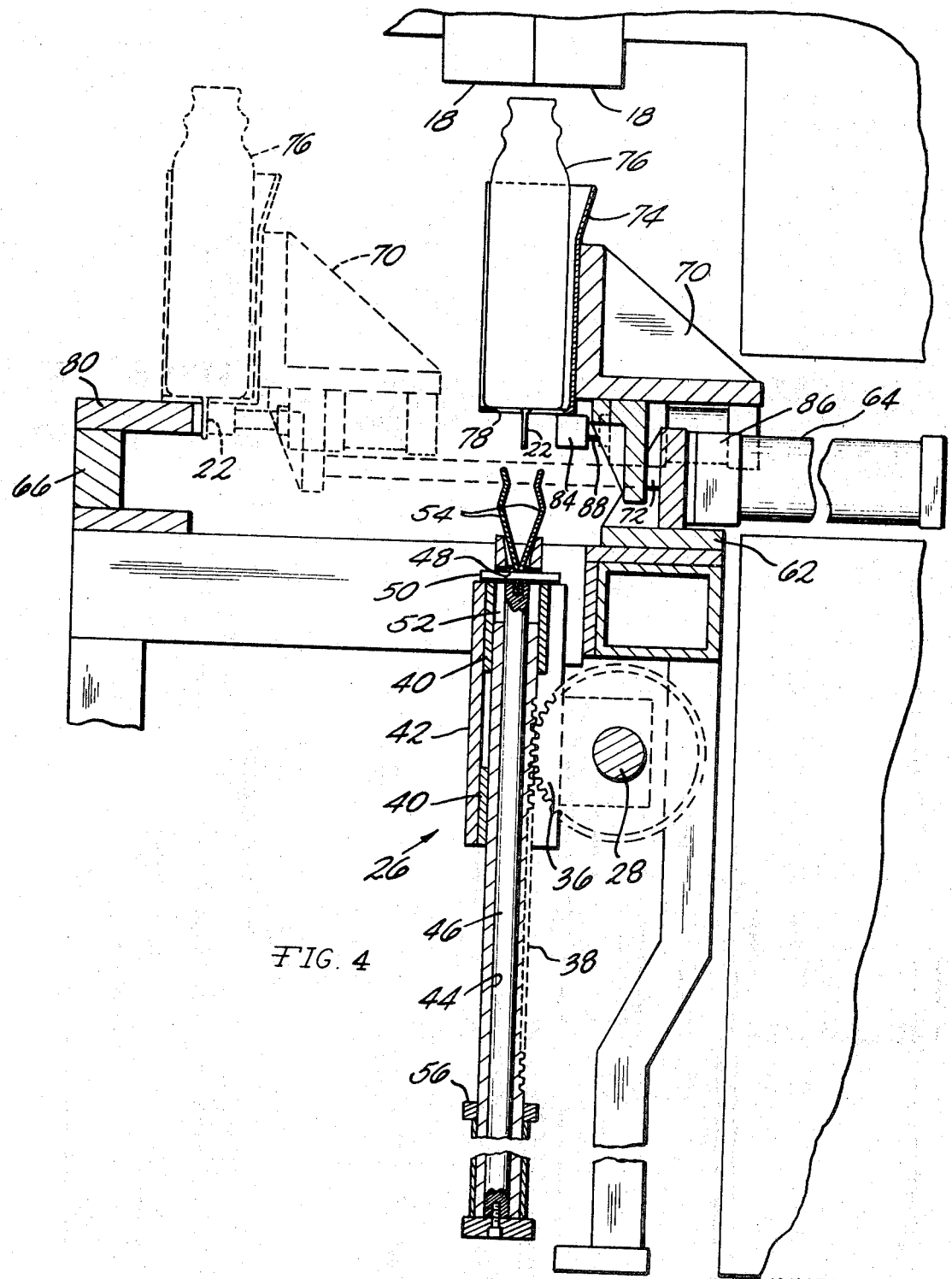

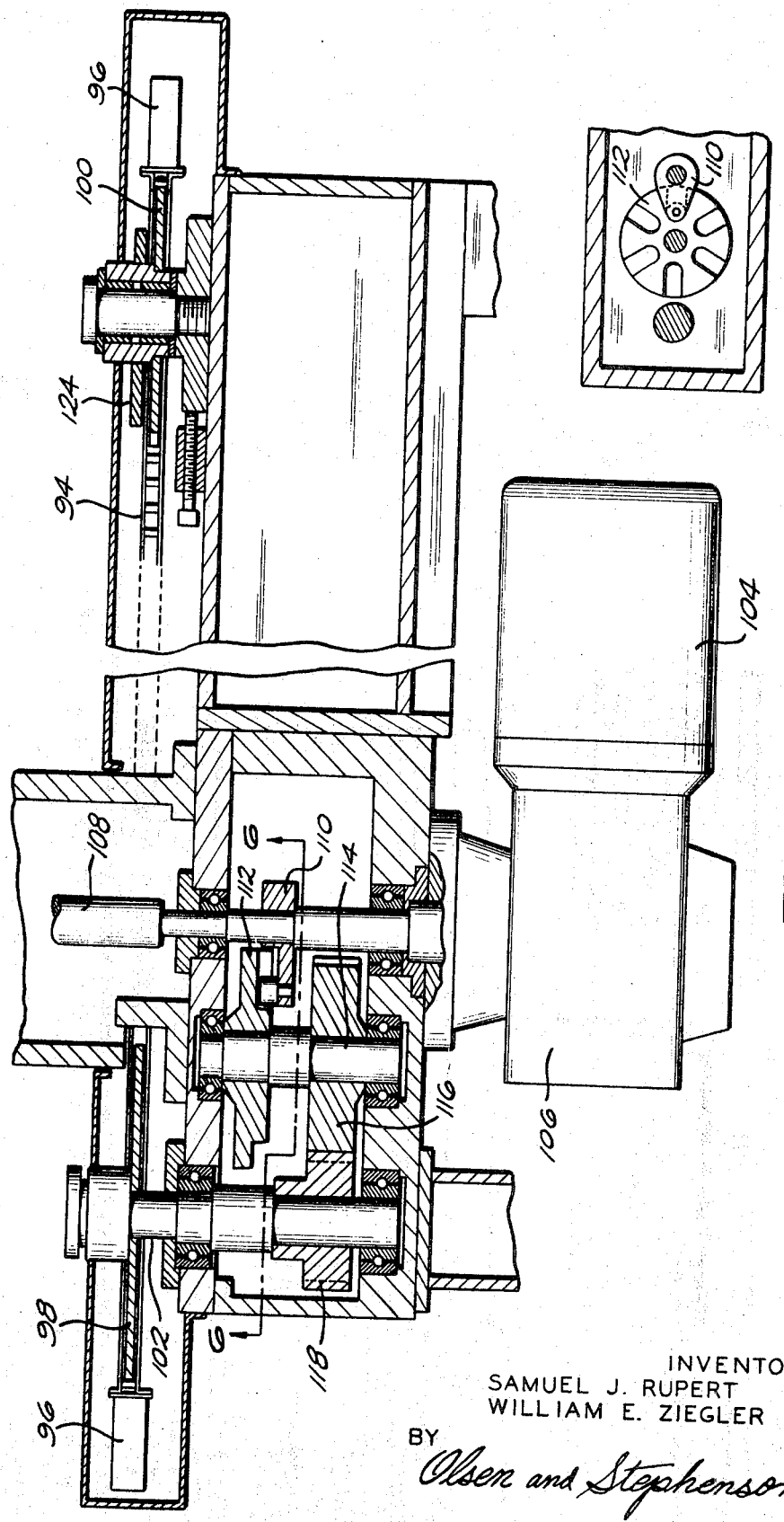

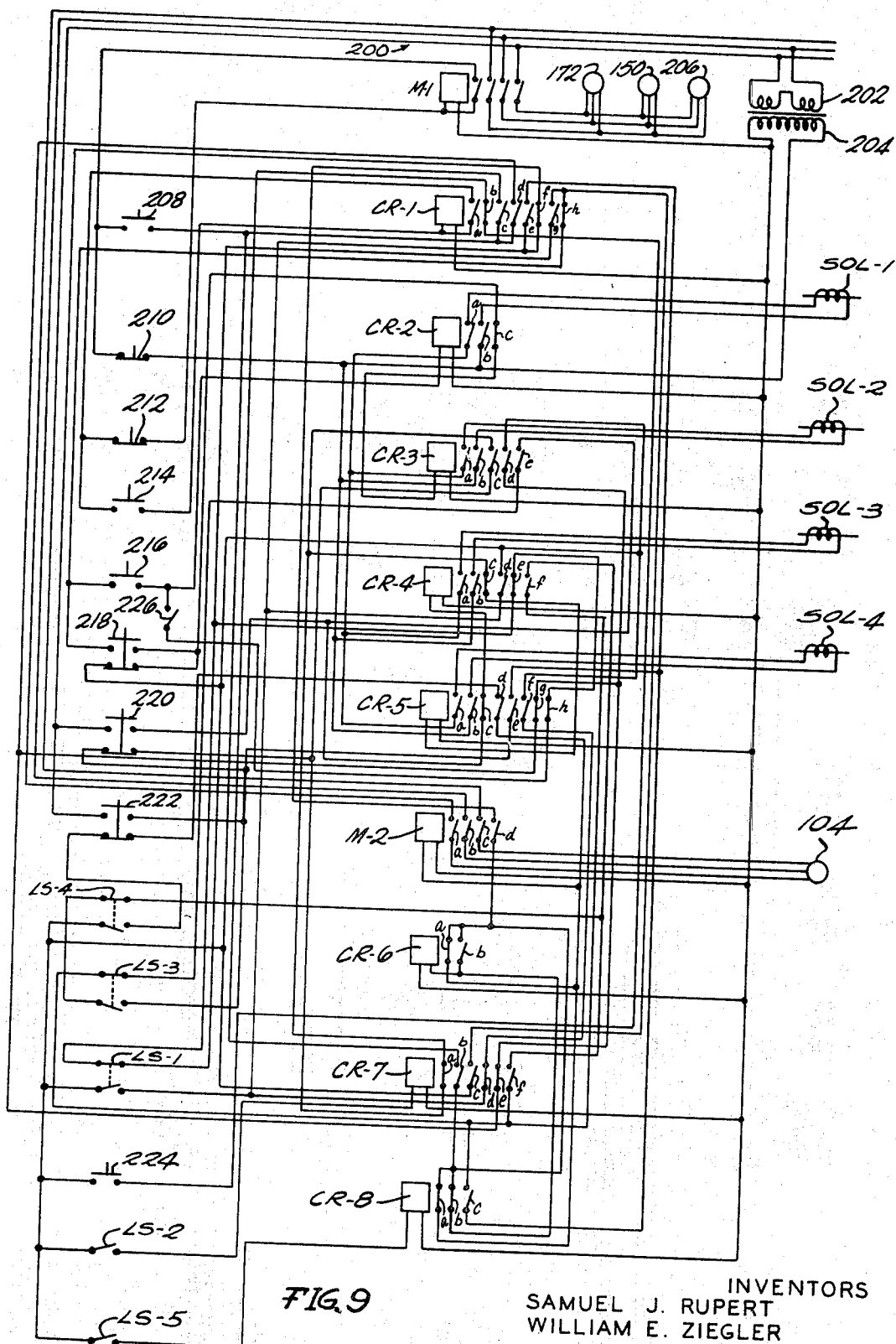

United States Patent Office 3,533,132
Patented Oct. 13, 1970

3,533,132
APPARATUS FOR BLOW MOLDING, HANDLING AND FINISHING HOLLOW PLASTIC ARTICLES
Samuel J. Rupert and William E. Ziegler, Ann Arbor, Mich., assignors to Hoover Ball and Bearing Company, Saline, Mich., a corporation of Michigan
Filed Feb. 26, 1968, Ser. No. 708,322
Int. Cl. B29d 23/03
U.S. Cl. 18—5                                                 9 Claims

ABSTRACT OF THE DISCLOSURE

Apparatus for blow molding a plurality of plastic bottles, and handling and trimming apparatus for removing the blown bottles from the blow molds and continuously thereafter holding such bottles in upright positions while they are being translated through a series of work stations so that the finished bottles can be discharged if desired in a fixed upright position for subsequent operations, such as bottle filling operations, carton loading operations, and the like.

CROSS REFERENCE TO RELATED APPLICATION

The present application relates to apparatus of the type disclosed in copending application Ser. No. 416,991, filed Dec. 9, 1964, and assigned to the assignee of the present application, now Pat. No. 3,417,428, issued Dec. 24, 1968.

BACKGROUND OF THE INVENTION

It is conventional practice in the blow molding industry to form blown plastic articles which when removed from the blow molding machine are encumbered with excess scrap material which must be trimmed from the blown article in order to provide a finished container. For example, one common type of blow molding machine includes a die head which extrudes a plurality of downwardly extending tubular parisons open at their lower ends. Horizontally movable mold sections disposed below the die heads move from positions spaced on opposite sides of the parisons into engagement so that they pinch the lower ends of the parisons closing them, and also to form mold cavities around such parisons. Following the cosing of the mold sections, the parisons are blown into conformity with the mold cavities. When the plastic cools, the portions of the parisons which were pinched together by the molds form tails which are integral with and depend from the bottom of the blown articles. Since the tails are formed in this manner, they are always in a predetermined position on the blow molding machine, namely, in positions vertically aligned with the center lines of the die heads, and they are always, therefore, in known positions with respect to other portions of the blown article. In forming the articles, which are subsequently stripped and torn from the heated plastic material remaining in the die heads, it is conventional to provide a stripper mechanism which is operated in timed relation to the opening of the mold sections for stripping the blown articles from the plastic material remaining in the die heads.

As is shown in copending application Ser. No. 416,991, it is also known to provide apparatus for removing blown articles of the type described and to transfer them through a series of work stations to finish the blown articles.

SUMMARY OF THE INVENTION

The present invention is constructed and arranged to overcome shortcomings of the prior art and to provide improved and more expeditious handling of blown articles, such articles being removed in fixed positions from the mold sections, the fixed positions corresponding to those positions which the articles had in the mold sections, and such articles are continuously held in these positions during a series of movements during which the articles are finished. The invention also permits the finished articles to be discharged in the fixed positions to facilitate subsequent handling in other operations involving, for example, filling of such articles, loading such articles into cartons, and the like.

According to one form of the present invention, blow molding apparatus is provided including separable mold sections for blow molding simultaneously a plurality of plastic bottles. The mold sections have, when closed, a downwardly facing portion or cavity from which waste material extends as a tail on the hollow blown articles formed between the mold sections. Handling and trimming apparatus is provided comprising an article removal assembly positioned at a first station below said mold sections and having a plurality of gripper mechanisms, corresponding in number to the number of bottles to be blown. The gripper mechanisms are movable upward to said portion or cavity into gripping engagement with the tails projecting from the closed mold sections, and operable after having grippingly engaged said tails to move back to said first station in response to a signal from said blow molding apparatus. In a preferred form of the invention this signal is provided when the stripper mechanism of the blow molding machine is actuated to strip the blown articles from the extrusion die heads. A shuttle assembly is provided with a carriage at said first station containing nest members for holding said articles in fixed upright positions, each of said nest members having a central opening and its associated gripper mechanism being movable vertically upward through said opening for gripping the tail of its associated container and operable on its return movement to release said tail when said article is seated in the nest member with the tail depending through said hole. The carriage is movable laterally to a second station, and means are provided on the shuttle assembly for gripping the depending tails and as an incident to movement of the carriage to the second station to remove said tails from the articles. A transfer assembly having transfer or conveyor means movable intermittently thereon through said second station is provided, said transfer means including article holding members each positioned to receive one of the articles respectively in the fixed upright positions and to hold the same in such positions during transfer on said transfer assembly. The transfer assembly includes a drive means including an intermittent motion mechanism for intermittently moving the plurality of articles deposited in the holding members sequentially past a pair of finishing or cutter means positioned adjacent to and in alignment with the path of movement of the transfer means.

In the preferred embodiment of the invention six articles are blown simultaneously and are simultaneously transferred to the transfer assembly, and two such cutter means are provided for finishing the series of articles. The transfer means is therefore arranged to make three intermittent movements for moving two articles per movement to the two cutter means, and such three intermittent movements occur during one cycle of the transfer assembly. Suitable control means are provided so that the transfer assembly operates independently of the shuttle mechanism, and in the event the six articles have not been moved from the second station prior to the time of movement of the shuttle assembly for transferring six additional blown articles to the second station, the shuttle assembly will be interrupted in its movement to prevent interference between the shuttle assembly and the transfer assembly. After the articles have been finished at the cutter means, the articles are discharged from the transfer assembly still in the vertical upright position from which they were removed from the blow molding machine. Control means are provided for manually or automatically cycling the described apparatus.

Accordingly, it is an object of the present invention to provide improved apparatus for producing finished blown plastic articles.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 2 is a side elevational view of the apparatus illustrated in FIG. 1 showing the shuttle mechanism in its retracted position at a first station;

FIG. 4 is a section taken on the line 4—4 of FIG. 1 showing a bottle gripper mechanism in its lowermost position and the shuttle at said first station and showing in phantom the position of the shuttle immediately prior to the removal of the tail from a blown article;

FIG. 5 is a section taken on the line 5—5 of FIG. 1 illustrating the drive mechanism for the transfer assembly;

FIG. 6 is a fragmentary section taken on the line 6—6 of FIG. 5;

FIG. 8 is a schematic diagram of the hydraulic system for raising and lowering the gripper mechanisms of the article removal assembly and for reciprocating the carriage of the shuttle assembly between the first and second stations; and FIG. 9 is a schematic wiring diagram of the control circuits for manual and automatic operation of the invention.

DESCRIPTION OF THE PREFERRED EMBODIMENT

Figure 1:
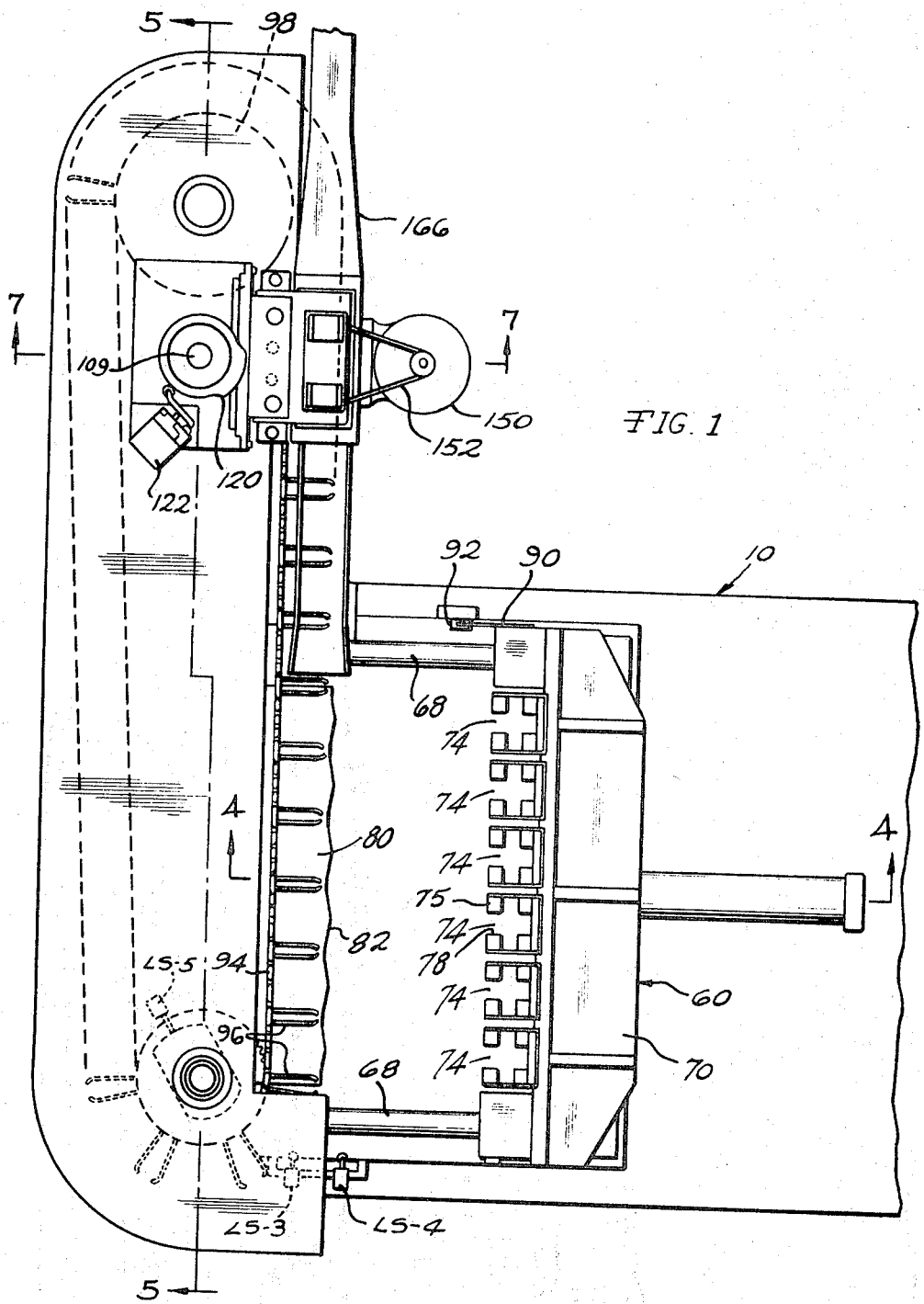
FIG. 1 is a top plan view of a preferred embodiment of the invention with portions of the blow molding machine broken away to facilitate illustrating the handling and trimming portion of the apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. Only a fragmentary front end portion of the blow molding machine 10 is shown because only the illustrated portions of the machine 10 are pertinent to the handling and trimming portions of the invention. The machine 10 is of the type shown and described in U.S. Pat. No. 3,351,981, assigned to the assignee of this invention, and includes a main frame 12 having mold carrying platens 14 positioned below the die heads 16 (only one of which is shown) and carrying mold sections 18. The latter are movable horizontally toward each other (by means not shown) into engaged positions in which they form a plurality of mold cavities 20 which are disposed below and in a centered relation to the die heads 16. The center lines of the die heads 16 are disposed in a vertical plane and the parting line or surface of each of the mold cavities formed by the mold sections 18 is also disposed in such plane. It will also be observed that the mold sections 18 have a portion or cavity 22 opening in a downward direction from which the tail of each formed container extends.

Positioned above the mold sections 18 is a stripper element 24 which is operable to move downwardly into engagement with the top of the plastic article formed in the mold cavity 20 so as to strip it from the heated plastic material remaining in the die head 16. When the mold sections 18 reach their closed positions, a relay (not shown) becomes energized and remains closed until the mold sections open and the containers are stripped from the blow molding machine. At the instance the stripper 24 starts downward, the relay (not shown) is de-energized and drops out. This provides a signal produced by a contact closure, which will be described in connection with the electrical control circuit. The signal is directed to the bottle handling apparatus and functions to synchronize the operation of the handling apparatus with the blow molding operation as will presently be described. Thus, in normal operation the relay is closed when the mold sections become closed, and the relay opens when the stripper 24 starts down.

Positioned immediately below the mold sections 18 in vertical alignment with the parting surfaces of the closed mold sections is the article removal assembly 26. The article removal assembly 26 includes the rotatable gear shaft 28 which is keyed to a pinion 30 which is in mesh with a rack 32. The rack 32 is vertically movable as a part of the vertical hydraulic cylinder 34 so as to turn the pinion gear 30 in either direction. Also keyed to the gear shaft 28 for rotation therewith are a plurality of driven gears 36, only one of which are shown, but six such gears are uniformly spaced along the length of the shaft 28. Each gear 36 is in mesh with one of the driven racks 38 so that when said shaft 28 is turned in one direction, the driven rack 38 will be moved upwardly, and when turned in the other direction, the driven rack 38 will be lowered. Each driven rack 38 is supported by suitable bearing means 40 in the stationary housing 42 and has a hollow bore 44 in which is carried a rod 46. At the upper end of each rod 46 is a slot 48 in which is positioned a transverse pin 50. Each driven rod 38 has a slot 52 extending through its upper end in which the pin 50 can move in an axial direction for a limited distance. Also positioned on the pin 50 are the spring fingers 54 which together with their supporting structures comprises a gripper mechanism for gripping a tail 22 extending from the mold sections 18 when the gripper mechanism has been elevated to its uppermost position. This gripping action occurs when the limit stop 56 positioned on the lower end of the driven rack 38 engages the lower end of the housing 42. It will be noted from FIG. 4 that the limit stop 56 is securely connected to the rod 46, so that when the limit stop 56 engages the housing 42, the drive gear 36 will continue to move the driven rack 38 upwardly away from the limit stop 56, and this will have the effect of moving the upper ends of the driven rack against the gripping fingers 54, causing them to move together into gripping engagement with the tail. The fingers 54 will not be returned to their normal position shown in FIG. 4 until the gripper mechanism is lowered to its lowermost position, and when this is done, the pin 50 will engage the upper end of the housing 42 and thereby stop the downward movement of the rod 46. However, the gear 36 will continue to lower the rack 38, and this will have the effect of moving the pin 50 up in the slot 52 until the spring fingers 54 can again return to their spread-apart positions shown in FIG. 4. For control purposes, a limit switch LS–1 is mounted in a stationary position on the frame and is operative to indicate when the gripper mechanism is in its lowermost position. Thus it will be understood that the article removal assembly 26 comprises a plurality of bottle gripper mechanisms equal in number to the number of cavities in the mold sections so that a gripper mechanism can be raised up into gripping engagement with each of the tails of the bottles formed in the mold sections 18, and when the gripper mechanisms are lowered in unison, the six bottles will also be lowered therewith, being held continuously in the vertical positions shown in the drawings wherein the bottles will remain in the plane which contained the parting surfaces of the closed mold sections.

Also positioned below the mold sections 18 is the shuttle assembly 60. The latter includes a rigidly mounted cylinder bracket 62 on which is mounted the horizontal shuttle cylinder 64. Opposite from the bracket 62 is another rigid frame member 66 and extending between the bracket 62 and the frame member 66 are tie bars 68 on which a carriage 70 is adapted to reciprocate. Motion is imparted to the carriage 70 by the rod 72 of the hydraulic cylinder 64. Mounted across the front face of the carriage 70 are a plurality of nest members 74 which correspond in number to the number of bottle-forming cavities in the mold sections 18. The nest members 74 are arranged so that their longitudinal axes will coincide with the axes of the bottles in the mold cavities and also with the axes of the rods 46 of the gripper mechanism. As shown best in FIG. 1, each nest holder 74 has bottom wall portions 75 closing only the four corners and a substantially X-shaped hole exists in the bottom of each of these nest members. Thus, when the nest member 74 is in the position shown in FIG. 4, the gripper mechanism positioned therebelow can be moved axially upwardly through the hole in the bottom of the nest into gripping engagement with the tail 52, and on the return stroke of the gripper mechanism, the bottle 76 will be seated in the bottom of the nest member 74 with its tail 22 extending through the hole 78 in the bottom. Thus, the gripper mechanism can move the bottle 76 from its position between the mold sections 18 vertically downwardly and deposit the bottles 76 in precisely the same position in the nest 74. The article removing assembly and the shuttle assembly are now in positions which may be defined as their first positions, and the carriage 70 can be moved laterally by actuation of the hydraulic cylinder assembly 64.

Mounted on the frame member 66 is a stationary tie bar 80 which has a sinuous front edge 82, as best seen in FIG. 1. Mounted on the carriage 70 for limited movement relative thereto is the movable tail bar member 84 which has a sinuous front edge (not shown) adapted to matingly engage the sinuous front edge 82 of the stationary bar 80. For the purpose of imparting limited relative movement to the movable tail bar 84, an air cylinder 86 is mounted on the carriage 70 and has a rod 88 to which the movable tail bar member 84 is connected.

The purpose of the stationary tail bar 80 and the movable tail bar 84 is to grip the tails 22 firmly when the carriage 70 has advanced to the position shown in broken lines in FIG. 4 so that further movement of the carriage 70 to the left will have the effect of shearing the tails 22 from the bottles 76. For this purpose the air cylinder 86 is actuated by means of an air valve which is opened when the cam member 90, rigidly mounted on the carriage 70, engages an air valve member 92 mounted on the carriage frame. This action of the air cylinder 86 has the effect of advancing the movable tail bar 84 into engagement with the tails 22 where it will remain until the tails engage the stationary tail bar 80. As the carriage 70 advances further the tails 22 will then be sheared from the bottles 76, and the tail bar 84 will yield relative to other parts of carriage 70 to the extent permitted by the air cylinder 86.

When the carriage 70 has advanced the container 76 to a position fully over the stationary tail bar 80, the shuttle assembly may be considered to be in its fully advanced or second position.

Figure 3:
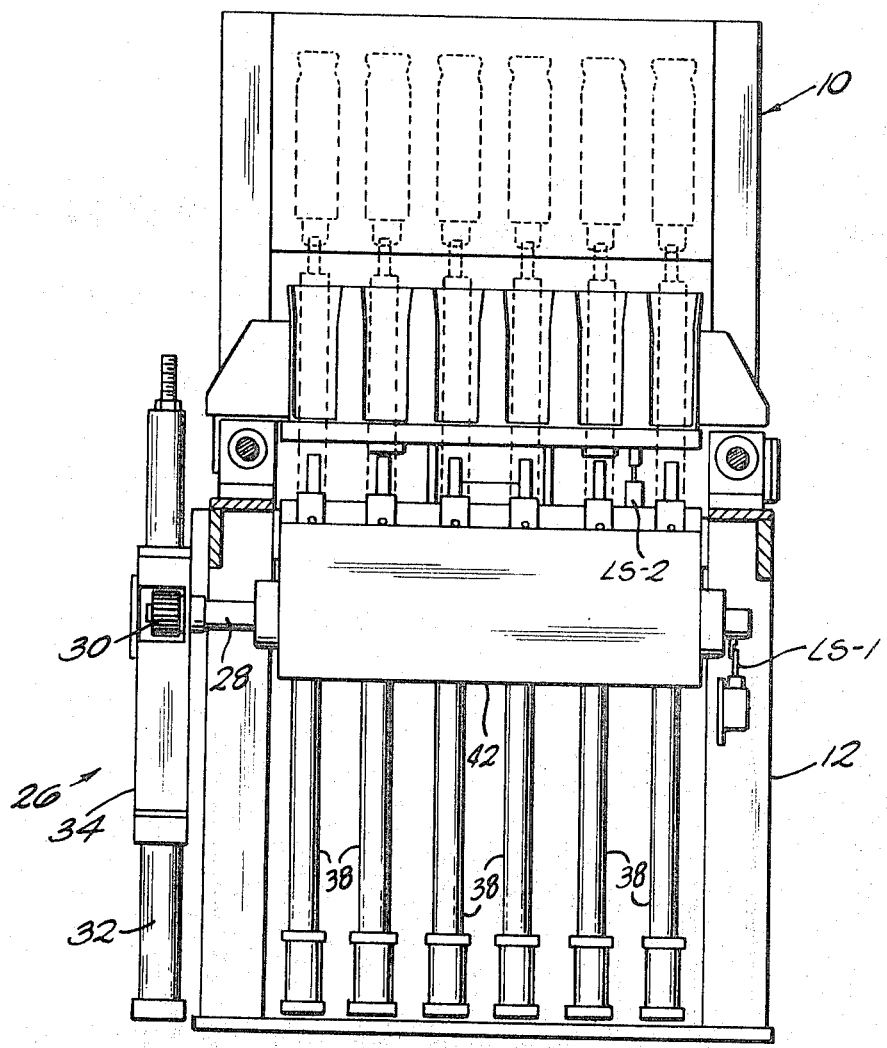
FIG. 3 is a section taken on the line 3—3 of FIG. 2 showing the bottle removal assembly positioned at said first station and showing in phantom the gripper mechanisms in an elevated position in gripping engagement with the tails of the blown articles.

Referring to FIG. 1, it will be noted that an endless transfer means or a conveyor chain 94 is positioned to travel lengthwise of the stationary tail bar 80 in a path perpendicular to the path of movement of the shuttle assembly, previously described. The transfer means 94 includes a plurality of resilient fingers 96 which open in the direction of the carriage 70, and each pair of such fingers 96 is equal in number to the nest members 74 and is positioned in the line of movement respectively of one of such nest members 74. Thus, when the carriage 70 has moved to its second position, it will also have deposited or positioned the containers 76 between the fingers 96 as an incident to movement of the shuttle assembly from the first position to the second position. When the shuttle assembly is returned to its first position, the fingers 96 will retain the containers 76 thereon, and thus it will be seen that once again the containers have been transferred to a different location while still maintaining their original vertical upright positions. For the purpose of assuring proper synchronization of the operation of the transfer means 94 and the shuttle assembly, limit switches LS-3 and LS-4 are mounted on a stationary frame member and are adapted to be engaged by the carriage 70 during its movement between its first and second positions. Also mounted on a stationary member to indicate when the shuttle assembly is in its retracted or first position is the limit switch LS-2, see FIG. 3. The operation of these limit switches will be subsequently described in connection with the circuits shown in FIG. 9.

Referring now particularly to FIGS. 1, 5 and 6, the operation of the transfer assembly will now be described. The transfer means or chain 94 is connected to a sprocket 98 and is driven thereby. The chain is also mounted on the sprocket 100 so as to provide an endless chain drive. The sprocket 98 is mounted on the shaft 102 for rotation therewith. Driving of the shaft 102 is provided by means of the transfer motor 104 which is connected with the gear box 106 for continuously rotating the shaft 108. Keyed to the shaft 108 for rotation therewith is the element 110 which together with the wheel member 112 comprises a conventional intermittent drive Geneva mechanism. The wheel member 112 is keyed on the shaft 114, and also connected to the shaft 114 is the gear 116 which in turn is in mesh with the gear 118 which is keyed to the shaft 102. Thus, an intermittent driving mechanism is provided for intermittently moving the transfer means or chain 94. In the illustrated embodiment three such intermittent movements are required to move six containers from the second station.

Keyed to the upper end of the shaft 108 is a spline shaft 109 (FIG. 7) on the upper end of which is mounted the cam wheel 120 which is adapted when rotating to actuate the air valve 122 for a purpose to be described. Also mounted for rotation with the other sprocket 100 is the cam 124 which is adapted to actuate the limit switch LS-5 so that the transfer means continues to index until it has completed the three indexes which are sufficient to move the six containers, and thereafter the transfer assembly will interrupt indexing operation and will wait until the next cycle has progressed to the point where once again six containers are moved to the second station for movement of such containers by the transfer means 94.

In operation of the transfer assembly, so long as the transfer means 94 continues in a straight line, the containers held between the fingers 96 will be retained. However, when the transfer means 94 departs from a straight line such as occurs when it rotates about the drive sprocket 98, the fingers 96 will continue to be directed radially outwardly, and therfore, they will spread apart at their outer ends, thereby releasing their holding actions on the containers. Also, as shown, guide shutes may be utilized to direct movement of the containers which are being moved by the fingers. A discharge station can be provided where the transfer means 94 departs from the straight line path, and the containers can be discharged in upright positions to other apparatus for performing desired operations, such as filling the containers, inserting the containers in cartons, or the like. Carrying out operations at such other apparatus will be facilitated by the fact that the containers or bottles are still in the same vertical upright and aligned positions that they assumed when in the mold cavities.

Figure 7:
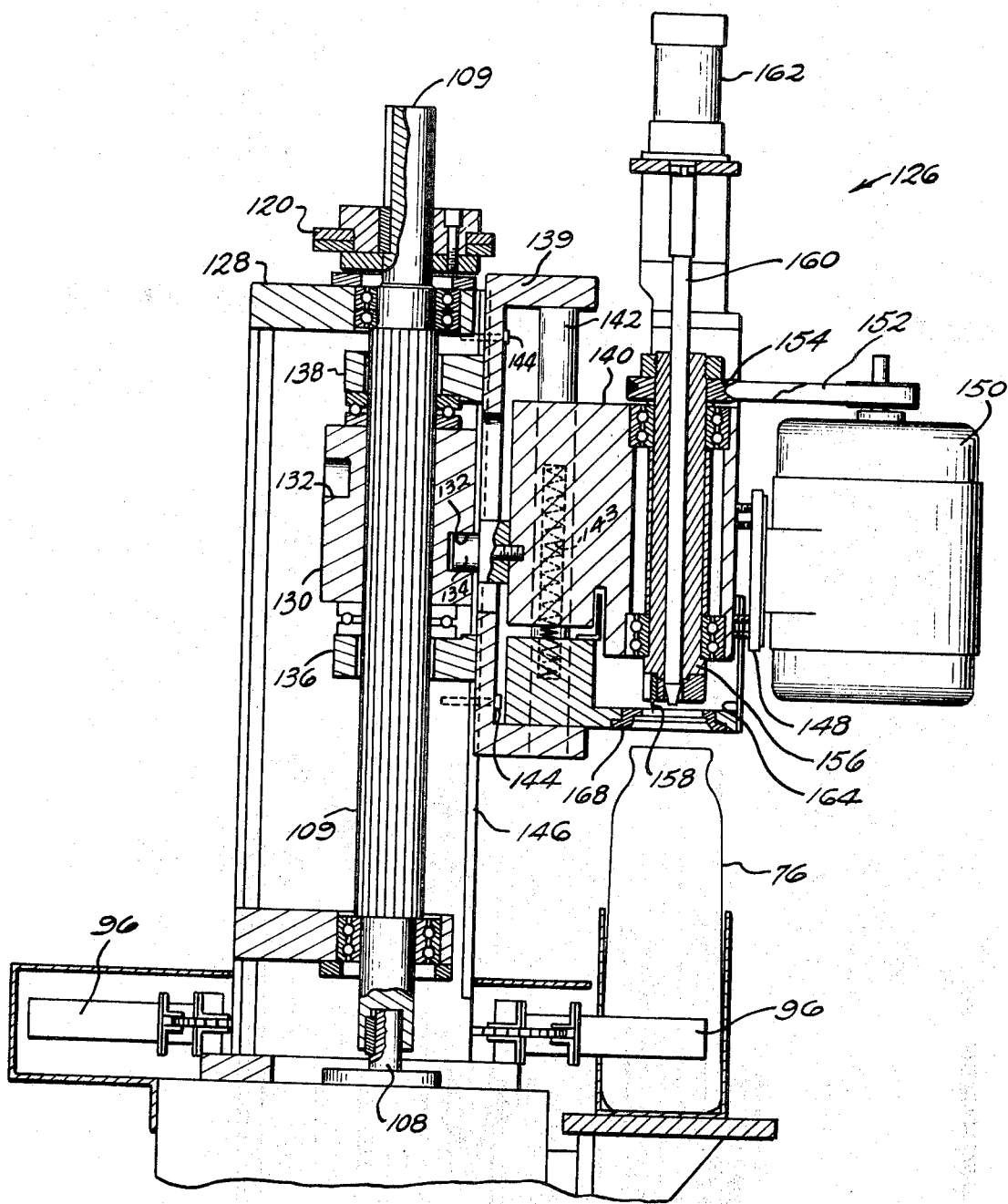
FIG. 7 is a section taken on the line 7—7 of FIG. 1 illustrating one of the cutter means for trimming the upper end of a blown plastic article.

Referring now to FIGS. 1 and 7, a brief description will be given of the finishing assembly or the cutting means 126. The finishing means 126 includes the spline shaft 109 which is keyed to the shaft 108, driven by the transfer motor 104, described in connection with the transfer assembly. The spline shaft extends upwardly through the housing 128 and has the cam 120 keyed thereto for actuating the air valve 122. Also splined to the spline shaft 109 is the barrel cam 130 which has a cam slot 132 therein in which a cam follower 134 is positioned. The barrel cam 130 is retained against axial movement by means of the brackets 136 and 138 which are secured to the frame member 139 by suitable means (not shown). Thus, when the spline shaft 109 and its barrel cam 130 is rotated by means of shaft 108, the cam follower 134 will be reciprocated upward and downward, and this will move the assembly 140 in a corresponding manner. The assembly 140 is mounted on the bars 142 for such reciprocal movement. Coil springs 143 are provided for resiliently supporting the parts of the assembly 140 which reciprocated with cam follower 134. The rods 142, only one of which is shown, are integrally secured to the frame member 139. It will be noted that the frame member 139 is secured to the housing by the screws 144 and is adapted to travel in the guideway 146 thereby permitting vertical adjustment of the frame member 139, and this will also result in the cam 130 being similarly adjusted on the spline shaft 109. These adjustments are provided so that bottles of different size can be finished at the finishing assembly 126.

The assembly 140 has mounted on the plate 148 the electric motor 150 for driving the drive belt 152 for in turn driving simultaneously the two cutting means that are provided. These cutting means are the same so only one will be described. The belt 152 is drivingly connected to the wheel 154 which is secured on the shaft 156 for rotating the cutter element 158.

From the foregoing description it is to be understood that the cutter element 158 will continue to rotate so long as it is driven by the electric motor 150. The complete assembly 140 can reciprocate up and down so as to permit the cutter element 158 to engage the top surface of the bottle 76 to trim finish the top surface thereof. Other suitable cutter devices may also be used at this station.

It will be recognized that when trimming the bottles in the manner described, waste or scrap material will fall into the bottles unless suitable precautions are taken. For this purpose, an air pin 160 is provided which can be lowered to a position adjacent to the bottom of the bottle by means of the air cylinder 162. Air under pressure is supplied to the air pin 160 at the time intervals established by the operation of the cam 120 on the air valve 122. In the preferred operation, air is introduced through the air pin 160 as it is entering the bottle, and it will continue to discharge air into the bottle during the complete cutting operation. Also, to facilitate removal of the scrap, a suitable low pressure system is provided for pumping the air from the compartment 164 surrounding the cutter 158 and discharging such air through the chute 166.

Preferably the lower end of the assembly 140 will contain a replaceable fitting 168 which is adapted to fit the particular bottle 76 that is to be trim finished, so that when the assembly 140 is lowered onto the top of the bottle, the fitting 168 will center the bottle to assure proper cutting action by the cutter 158.

Referring now to FIG. 8 of the drawings, the hydraulic circuits for operating the vertical shuttle cylinder 34 of the article removal assembly and the horizontal shuttle cylinder 64 of the shuttle assembly will be described. As there shown, a pump 170 is provided which is driven by the electric motor 172 for supplying fluid under pressure from a source at 173 to the cylinder. The double acting hydraulic cylinder 34 is in communication with the pump 170 via the solenoid actuated valve 174, the conduit 176, and either of parallel conduits 178 and 180 for lowering the cylinder, and via conduit 182 and either of parallel conduits 184 and 186 for raising the cylinder. The parallel conduits have check valves 188 in one conduit to prevent return flow so that the other conduit functions to control the back pressure and thereby the rate of movement of the cylinder because of the presence of the flow control elements 190. In operation, when it is desired to raise the gripper mechanisms controlled by cylinder 34, the solenoid SOL-1 must be energized moving the valve element to the left, and conversely, when it is desired to lower the gripper mechanism, solenoid SOL-2 must be energized.

The arrangement for moving the shuttle assembly to its forward position is similarly accomplished by energizing solenoid SOL-3 and to move the shuttle assembly to its retracted position solenoid SOL-4 must be energized. However, as a safety factor, to assure that the gripper mechanism is in its lowermost position so as not to interfer with action of the shuttle assembly during movement in either direction, it is also required that solenoid SOL-2 be energized to hold the gripper mechanism in its lowermost position. Thus, the hydraulic fluid which passes through solenoid valve 192 must also be passed through solenoid valve 174 which has been actuated to assure the proper positioning of the gripper mechanism.

Referring now to FIG. 9, the electrical control system will be explained. As there shown, a source of high voltage power is provided at 200 to which the primary of a transformer 202 is connected, the secondary 204 being in circuit to provide a lower voltage to the various control circuits. Also driven from the power source 200 are the hydraulic motor 172, the spindle motor 150 and air motor 206 which are controlled by relay M–1.

The system can be operated either manually or automatically. The system includes the limit switches LS–1, LS–2, LS–3, LS–4 and LS–5, and the solenoids SOL–1 through SOL–4, previously described. For manual operation only limit switches LS–1, LS–2 and LS–5 and the solenoids SOL–1 through SOL– 2 are required.

Shown in the circuitry are the control relays CR–1 through CR–8 and M–1 and M–2. The basic functions of these relays will initially be briefly described. Control relay CR–1 serves as a manual-automatic selector. When the relay is energized the system will be in automatic operation and when deenergized the system will be set for manual operation.

The basic function of CR–2 is to energize solenoid SOL–1 to effect upward movement of the gripper mechanism. Similarly, the basic function of CR–3 is to energize solenoid SOL–2 to effect downward movement of the gripper mechanism. CR–2 and CR–3 are interlocked by contact CR–2c which prevents these relays from being energized simultaneously.

The basic functions of control relays CR–4 and CR–5 are to move the shuttle carriage 70 to forward and retracted positions by energizing respectively solenoids SOL–3 and SOL–4.

The basic function of CR–6 is to cooperate with limit switch LS–5 in controlling the operation of the transfer assembly.

The basic function of CR–7 is to cooperate with limit switch LS–2 to indicate that the shuttle carriage 70 is positioned in its fully retracted position.

The basic function of CR–8 is to indicate, in cooperation with limit switch LS–5, that the transfer means 94 is indexed properly for cooperation with the shuttle assembly.

The basic function of relay M–1 is to control motors 172, 150 and 206, and also through its contact M–1a to act as an isolator from the main power system in the event of a temporary power failure or interruption so that manual restarting of the system is then required.

For manually operating the system push-buttons are provided for actuating the "start" switch 208, the "stop" switch 210, the "manual" switch 212, the "automatic" switch 214, the "gripper up" switch 216, the "gripper down" switch 218, the "shuttle forward" switch 220, the "shuttle retract" switch 222, and the "transfer" switch 224.

When it is desired to manually operate the system, control relay CR–1 must be deenergized so that contacts CR–1b, f, h are closed and the following steps are performed. Initially, the start switch 208 is closed which results in control relay M–1 being energized and locking itself to the starting circuit by means of contact M–1a and simultaneously the motors 172, 150 and 206 are started by closing of contacts M–1b, c, d. Assuming the gripper mechanism is down and the shuttle is in its retracted position, if it is desired to raise the gripper mechanism the swtch 216 is closed which will result in control relay CR–2 being energized closing contacts CR–2a, b resulting in the closing of a circuit to the solenoid SOL–1. This will result in the hydraulic cylinder 34 raising the gripper mechanism so long as switch 216 remains closed until the limit stop 56 of the gripper mechanism engages the housing 42.

To lower the gripper mechanism the switch 218 is closed (with the up switch open) which will result in closing a circuit through a closed contact CR–2c of deenergized relay CR–2 and control relay CR–3. Energizing of control relay CR–3 will close contacts CR–3a, b to the solenoid SOL–2 for lowering hydraulic cylinder 34. The gripper will continue downward so long as the switch 218 is closed until the gripper mechanism reaches its lower mechanical stop.

It will be recognized that for any movement of the gripper mechanism the limit switch LS–2 will be closed so that CR–7 will be energized. Failure of CR–7 to be energized will prevent either CR–2 or CR–3 from being energized.

To move the shuttle assembly to a forward position (and also to a retract position) the limit switch LS–1 must be actuated to indicate that the gripper mechanism is down. The switch 220 is closed which will result in a circuit being closed through control relay CR–4 for energizing solenoid SOL–3, but as previously explained in connection with FIG. 8, no hydraulic fluid is available to cylinder 64 until solenoid SOL–1 is also energized, for assuring that the gripper mechanism is down. The energizing of CR–3 results from a circuit being closed through contact CR–4d and CR–3 resulting in solenoid SOL–2 being energized to provide the necessary hydraulic fluid. The forward movement will continue until a mechanical stop is reached so long as the switch 220 remains closed.

For retracting the shuttle assembly the switch 222 is closed resulting in closing a circuit through normally closed contacts of switch 220, normally closed contact CR–7a, normally closed contact CR–4c and control relay CR–5. When CR–5 is energized, contacts CR–5a, d are closed in circuit with solenoid SOL–4 energizing the latter, and as previously indicated with respect to FIG. 8, no fluid is available until solenoid SOL–1 is also energized. This is accomplished by the closing of a circuit through normally closed contacts CR–7d, 5CR–5f, normally closed contacts of switch 218, normally closed CR–2c, and relay CR–3 again resulting in energizing of solenoid SOL–2. When the shuttle assembly reaches its retracted position it actuates limit switch LS–2 energizing CR–7 and thereby opening the normally closed contact CR–7a dropping out relay CR–5, and normally closed contact CR–7d dropping out relay CR–3.

For actuating the transfer assembly, CR–7 must be energized indicating that the shuttle is retracted. When the transfer index switch 224 is closed a circuit is established through normally closed contact CR–16, closed contact CR–7b, and, if the transfer mechanism is in proper position through normally closed contact CR–6a, to energize transfer motor 104, and, if the transfer mechanism is not in proper position, then through normally closed CR–8a to transfer motor 104.

The transfer motor 104 will continue to operate while switch 224 is closed until such time as the limit switch LS–5 is actuated indicating completion of a cycle, and if it is desired to repeat the cycle the switch 224 must again be manually closed. The sequencing of the control elements for manual operation is the same as with respect to the automatic operation which will subsequently be described.

When it is desired to operate the apparatus automatically the automatic switch 214 is closed energizing control relay CR–1, thereby opening contacts CR–1b, f, h associated with the various manual operations, and closing contacts CR–1a, c, d, e, g which are associated with the automatic sequencing. With the apparatus in the same starting position as previously described relative to the manual operations, that is, wherein the shuttle assembly is retracted and the gripper is down, the automatic cycling will next be described. In automatic sequencing the limit switches LS–1 through LS–5 are actuated as before and energizing of solenoids SOL–1 through SOL–4 will serve the same purposes of actuating the hydraulic cylinders 34 and 64.

As previously indicated, when cycling automatically it is necessary that a signal be received from the controls of the blow molding machine to initiate the cycle and to keep the operation of the bottle removal assembly synchronized with the operation of the blow molding machine. For this purpose a contact 226, which is controlled by the control relay (not shown) associated with the stripper mechanism 24, is provided in a circuit controlling the movement of the gripper mechanism.

When contact 226 is closed, CR–2 is energized by a circuit containing contact CR–7c, CR–1g, CR–4e, CR–5h contact 226 and CR–2 causing the gripper to move upward to its uppermost position. As it is moving upward LS–1 is released. The gripper is held in its uppermost position until contact 226 is opened.

When contact 226 is opened, CR–2 is deenergized which deenergizes solenoid SOL–1 and closes contact CR–2c which then allows CR–3 to energize through closed LS–1 and the normally closed contacts of switch 218. This will energize solenoid SOL–2 to start the movement of the gripper down to its lowermost position. At the time of starting this movement CR–3 closes to hold the relay energized through normally closed contact CR–5g.

The gripper continues down until it actuates limit switch LS–1 closing LS–1 to energize CR–4 through CR–1e, normally closed contact LS–3, contact CR–7f and normally closed LS–3, CR–3e, CR–5c. At this time CR–3 remains energized.

As soon as CR–4 has been energized it seals itself in and energizes solenoid SOL–3 so that the forward movement of the shuttle assembly begins.

When the shuttle starts forward the limit switch LS–2 is opened de-energizing the control relay CR–7. When the shuttle actuates LS–4, located a short distance before the end of the stroke, no action occurs if the transfer assembly is in synchronism. However, if the transfer assembly is not synchronized to the action of the shuttle assembly, the contact CR–8 will be open stopping the movement of the shuttle, and it will wait there until the transfer assembly is in synchronized position which will be indicated by limit switch LS–5, and the contact CR–8c will close restarting the movement.

The shuttle moves forward until switch LS–3 is actuated. This will de-energize CR–4 and solenoid SOL–3 and energize CR–5 through normally closed switch 220 and through CR–7a and CR–4c. Then CR–5 seals itself in and energizes solenoid SOL–4 and starts to retract, at which time LS–3 is released. As it retracts it will actuate LS–4 again, closing a circuit through closed contacts of switch 222 and CR–5d to start transfer motor 104.

With the transfer assembly continuing to operate, the shuttle will continue its return until LS–2 is actuated energizing CR–7 which will open contacts CR–7d, e and dropping out CR–3 to deenergize solenoid SOL–2. At this time contact CR–7a opens so that CR–5 can drop out thereby deenergizing solenoid SOL–4. Also at this time CR–7c closes and this allows the gripper to go up when and if contact 226 is closed, and the cycle can be repeated.

When the relay M–2 was energized for starting the transfer motor 104, it was sealed in through contact M–2d and normally closed contact CR–6a, and as the motor 104 continues to run, LS–5 will be released which deenergizes CR–8 allowing normally closed contacts CR–8a, b to close. This will energize CR–6 which seals in and opens its contact CR–6a. Upon actuating LS–5 again at the completion of its cycle CR–8 is energized opening contacts CR–8a, b to deenergize relay M–2, stopping the motor 104, and open contact M–2d and will then deenergize CR–6. The transfer assembly is now ready for repeating its cycle.

Having thus described our invention, we claim:

1. In combination, blow molding apparatus including separable mold sections having when closed a downwardly facing portion from which waste material extends as a tail on a hollow blown article formed in an upright position between the mold sections, and handling and trimming apparatus comprising an article removal assembly positioned at a first station below said mold sections and having a gripper mechanism movable vertically upward to said portion into gripping engagement with the tail projecting from the closed mold sections and operable when grippingly engaging said tail to move back to said first station in response to a signal from said blow molding apparatus, a shuttle assembly with a carriage at said first station containing a nest member for receiving said article in an upright position, said nest member having a central opening in its bottom portion and said gripper mechanism being movable vertically upward through said opening for gripping said tail and operable on its return movement to release said tail when said article is seated in an upright position in said nest member with the tail depending through said hole, said carriage being movable laterally to a second station, means on said shuttle assembly for gripping the depending tail and for removing said tail from the article during such movement, a transfer assembly having a transfer means movable intermittently through said second station, said transfer means including article holding members each positioned to receive an article in said upright position and to hold the same in such position during transfer on said transfer assembly, and cutter means positioned adjacent to the path of movement of said transfer means and operable for cutting in sequence the upper end of each article that is moved by the transfer means.

2. In the combination according to claim 1, wherein said gripper mechanism includes gripping fingers, a limit stop for engaging a stationary portion of the handling and trimming apparatus during upward movement of the gripper mechanism to actuate the gripping action of the fingers, and means for selectively changing the actuating position of the limit stop.

3. In the combination according to claim 1, wherein said means on said shuttle mechanism for gripping the depending tail comprises a stationary tail bar mounted adjacent to said second station transverse of the path of movement of the bottom of said nest member, and a mating tail bar movably mounted on said carriage for movement from a retracted position to an advanced position in engagement with the depending tail so that when said stationary bar is engaged during movement of said carriage, the tail will be removed as the nest moves past the stationary tail bar.

4. In the combination according to claim 3, wherein an air cylinder is mounted on said carriage and is operatively connected to said movably mounted tail bar for moving the latter to its advanced position, and control means for supplying air to said cylinder in response to movement of said carriage toward said second position.

5. In the combination according to claim 1, wherein said transfer means comprises a horizontally disposed conveyor chain having a straight path of travel through said second station transverse to the path of movement of said carriage, and said article holding members include spring fingers extending from said chain at spaced intervals, said fingers when at said second station facing said carriage so that an article in said nest can be inserted between two adjacent fingers on movement of said carriage to said second station.

6. In the combination according to claim 5, wherein said transfer assembly has a discharge station, said conveyor chain having a curved path of travel at said discharge station so that said fingers radiate in a direction outwardly of the curve so as to release the article confined between such fingers.

7. In the combination according to claim 1, wherein said cutter means including an air pin movable into the article in said adjacent holding member, and means for introducing air into said article during cutting of said article.

8. In the combination according to claim 7, wherein vacuum means are included in said cutter means to remove material cut from said article.

9. Apparatus for blow molding, handling and finishing hollow plastic articles, said apparatus including a plurality of sets of aligned horizontally separable mold sections having their parting surfaces in a common vertical plane, each set defining a cavity for blow molding a hollow article, said sections having downwardly facing recesses in which waste material extends as tails on the blown hollow articles formed simultaneously in the closed mold sections, gripping means for gripping said tails while said mold sections are closed and, when the mold sections are opened, for lowering said articles together in said plane to horizontally aligned upright positions at a first station with the tails projecting vertically downward, means for laterally moving said articles together in their aligned upright positions horizontally perpendicular to said plane to a second station and for removing said tails during movement to said second station, transfer means movable through said second station in a path perpendicular to the path of movement of said means for moving the articles laterally in series parallel to said plane and having aligned horizontal holding members in which the articles are deposited at the second station, and finishing means positioned adjacent to the path of movement of said transfer means for finishing the upper ends of said articles as such articles are moved in series by said transfer means.

References Cited

UNITED STATES PATENTS

| 2,790,994 | 5/1957 | Cardot et al. | 18—5 X |
| 3,040,376 | 6/1962 | Elphee | 18—5 X |
| 3,142,089 | 7/1964 | Wilkalis et al | 18—5 |
| 3,340,569 | 9/1967 | Hagen | 18—5 |
| 3,417,428 | 12/1968 | Rupert | 83—914 X |

J. SPENCER OVERHOLSER, Primary Examiner

M. O. SUTTON, Assistant Examiner

U.S. Cl. X.R.

83—914